(12) United States Patent
Harris

(10) Patent No.: US 6,260,126 B1
(45) Date of Patent: Jul. 10, 2001

(54) DATA STORAGE SUBSYSTEM HAVING APPARATUS FOR ENABLING CONCURRENT HOUSEKEEPING PROCESSING WHILE AN INPUT/OUTPUT DATA TRANSFER OCCURS

(75) Inventor: Kenneth M. Harris, Lafayette, CO (US)

(73) Assignee: International Busines Machines Corporation, Armonk, NY (US)

( * ) Notice: Subject to any disclaimer, the term of this patent is extended or adjusted under 35 U.S.C. 154(b) by 0 days.

(21) Appl. No.: 09/092,485

(22) Filed: Jun. 5, 1998

(51) Int. Cl.[7] .............................. G06F 12/00; G06F 13/00
(52) U.S. Cl. ...................... 711/167; 711/140; 711/154; 711/169
(58) Field of Search .................................. 711/140, 154, 711/167, 169

(56) References Cited

U.S. PATENT DOCUMENTS

| | | | |
|---|---|---|---|
| 3,972,023 | 7/1976 | Bodner et al. | 340/172.5 |
| 4,400,772 | 8/1983 | Broyles et al. | 364/200 |
| 4,831,520 | 5/1989 | Rubinfeld et al. | 364/200 |
| 5,133,069 | * 7/1992 | Asato et al. | 713/401 |
| 5,249,297 | 9/1993 | Brockmann et al. | 395/725 |
| 5,339,395 | 8/1994 | Pickett et al. | 395/325 |
| 5,341,482 | * 8/1994 | Cutler et al. | 712/244 |
| 5,379,381 | 1/1995 | Lamb | 395/275 |
| 5,386,518 | 1/1995 | Reagle et al. | 395/325 |
| 5,455,701 | * 10/1995 | Eng et al. | 359/135 |
| 5,475,855 | * 12/1995 | Uesugi | 712/216 |
| 5,790,838 | * 8/1998 | Irish et al. | 713/500 |

* cited by examiner

Primary Examiner—Tuan V. Thai
(74) Attorney, Agent, or Firm—Ohlandt, Greeley, Ruggiero & Perle, LLP; Noreen Krall Esq.

(57) ABSTRACT

The invention implements a method for enabling overlapped performance of data processing actions during data transfers between a DSS and a host processor. The DSS includes a state queue which holds a plurality of states, each state comprising a self-contained procedure which, upon execution, determines a readiness to execute of an associated task. The method initially determines an amount of available time during a data transfer wherein a front-end processor of the DSS would otherwise be idle. The method then causes the front-end processor to extract and execute a first state from the state queue during the data transfer, if available time during the data transfer exceeds or is equal to an estimated execution time of the first state. Then, if a task associated with the first state is found to be ready to execute, that task is listed on a task work queue for execution subsequent to the data transfer. If, after execution of the first state, additional time remains, further states may be executed, in each instance, however, care being taken to assure that the front-end processor is ready to accommodate a new input/output operation when the current input/output operation ends.

8 Claims, 4 Drawing Sheets

STATE ENTRY

—NEXT STATE

—PREVIOUS STATE

—WORST CASE
  EXECUTION TIME

—SUB STATE VALUE (E.G. LOGICAL
  PATH, LOGICAL DEVICE)

DATA STORAGE SUBSYSTEM HAVING APPARATUS FOR ENABLING CONCURRENT HOUSEKEEPING PROCESSING WHILE AN INPUT/OUTPUT DATA TRANSFER OCCURS

FIELD OF THE INVENTION

This invention relates to data storage subsystems and, more particularly, to a method and apparatus for enabling a data storage subsystem to perform housekeeping data processing functions during an input/output data transfer.

BACKGROUND OF THE INVENTION

Currently, data storage subsystems (DSSs) are configured as arrays of disk drives which provide high capacity storage for one or more attached host processors. Each host processor is coupled to the DSS via a high capacity communication channel and a dedicated front-end processor at the DSS. The front-end processor performs the command and protocol processing to facilitate the data transfers. However, when the actual data transfer occurs, it often by-passes the front-end processor and is performed as a "direct memory access" (DMA). Under such circumstances, the input data flows directly from the host processor to a cache memory in the DSS or from the cache memory in the DSS to the host processor, in both cases bypassing any buffering by the front-end processor. During a DMA, the front end processor is idle.

The prior art has suggested that such front end processors be applied to other functions during a DMA input/output data transfer action. U.S. Pat. No. 4,400,772 to Broyles et al., entitled "Method and Apparatus for Direct Memory Access in a Data Processing System" suggests that during a DMA, the central processing unit be placed in an idle state, without disturbing the central processing unit registers. This enables the central processing unit to then carry out secondary functions. One such suggested secondary function is to continue the refreshing of dynamic memory used in the system.

When a DSS processor, in a system such as described above by Broyles et al. remains idle, typically, the operating system relinquishes control of the DSS processor and makes it available for a new task. However, there is no guarantee how long the new task will take to execute. In such a case, if the DSS processor is occupied with the new task and the host processor's input/output operation finishes, the system remains in a wait state until the DSS processor again becomes available to perform an input/output function. This action may slow the system's primary function, i.e., input/output of data from/to the host processor. Only when the DSS processor becomes available to process the necessary command and interface data can an input/output action be accommodated.

Accordingly, it is an object of this invention to provide a method and apparatus for control of a DSS which enables a front end processor to be utilized for other tasks during an input/output data transfer.

It is another object of this invention to assure that the front-end processor of a DSS is available for use with an input/output action at the end of an input/output data transfer, irrespective of what other tasks have been assigned to it to be carried out.

SUMMARY OF THE INVENTION

The invention implements a method for enabling overlapped performance of data processing actions during data transfers between a DSS and a host processor. The DSS includes a state queue which holds a plurality of states, each state comprising a self-contained procedure which, upon execution, determines a readiness to execute of an associated task. The method initially determines an amount of available time during a data transfer wherein a front-end processor of the DSS would otherwise be idle. The method then causes the front-end processor to extract and execute a first state from the state queue during the data transfer, if available time during the data transfer exceeds or is equal to an estimated execution time of the first state. Then, if a task associated with the first state is found to be ready to execute, that task is listed on a task work queue for execution subsequent to the data transfer. If, after execution of the first state, additional time remains, further states may be executed, in each instance, however, care being taken to assure that the front-end processor is ready to accommodate a new input/output operation when the current input/output operation ends.

DETAILED DESCRIPTION OF THE INVENTION

Figure 1:
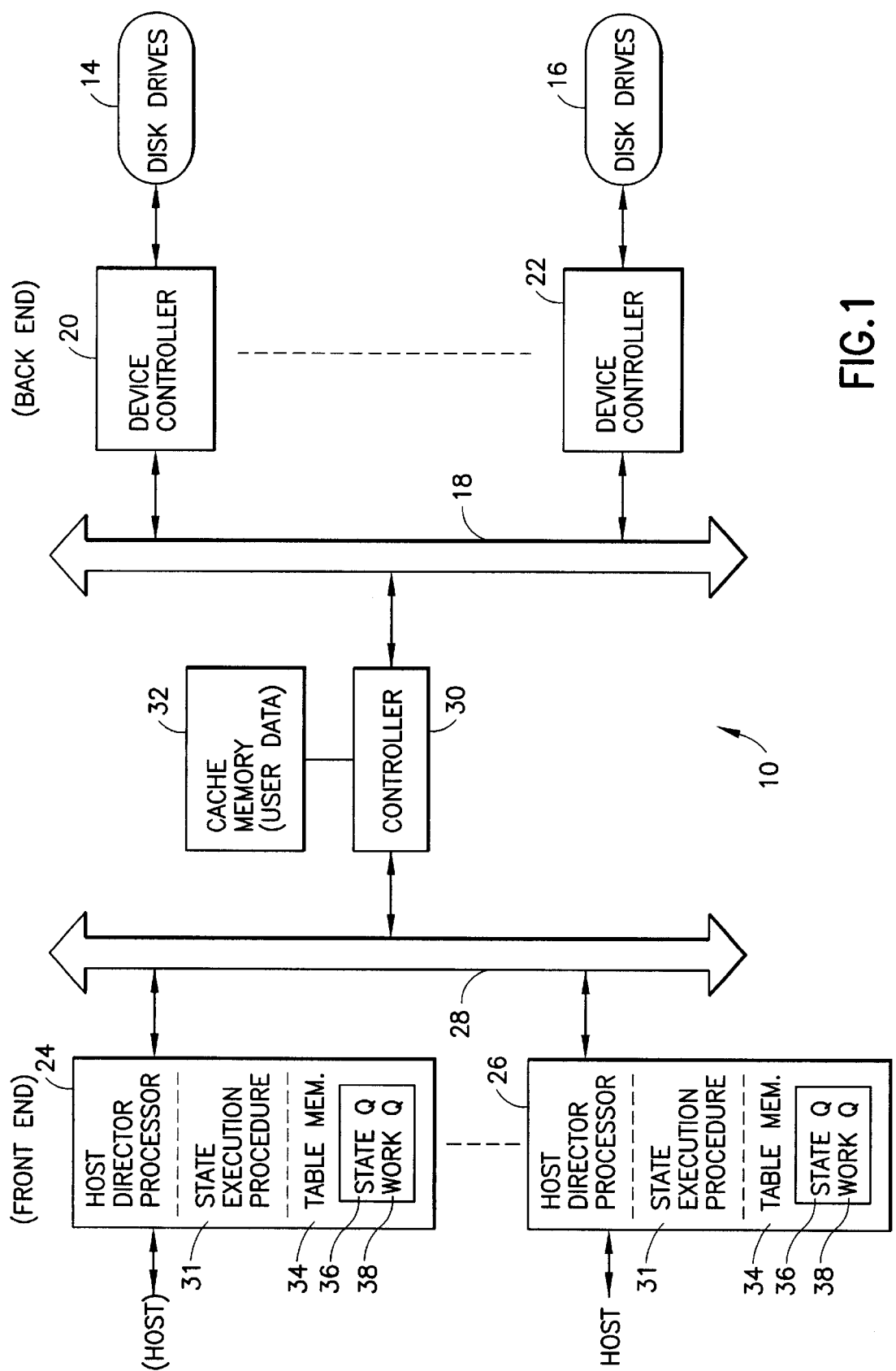
FIG. 1 is a high level block diagram of a DSS adapted to perform the invention.

Referring to FIG. 1, DSS 10 includes a plurality of disk drive units 14, 16, etc. which are coupled to a bus system 18 via device controllers 20, 22, respectively. The front end of DSS 10 comprises a plurality of host director processors 24, 26 each of which is, respectively, coupled to a host processor. Host director processors 24 are, in turn, coupled via a bus 28 to a controller 30. Controller 30 is coupled between buses 18 and 28 and controls input and output of data from a cache memory 32.

Each host director processor 24, 26, . . . etc. includes a state execution procedure which, in conjunction with the associated host director processor, implements the invention hereof. Each host director processor further includes a table memory 34, within which two queues are maintained, a state queue 36 and a work queue 38.

As used herein, a "state" is a self-contained procedure which enables determination of the readiness to execute of an associated task within DSS 10. As an example, a state may be a procedure which checks to see if the following functions are ready to execute: a periodic determination of "time-out" checks; a check for missing interrupts, logical device disable polling, etc. More precisely, a state procedure determines if a task is ready to run and, if yes, places the task on work queue 38, to be described in detail below.

A state procedure is one, by definition, which can be performed by a host director processor 24, 26, during an input/output data transfer. More precisely, a state procedure is one which can be executed when a DMA data transfer is in process, either from or to a host processor. Note, that while not shown in FIG. 1, a DMA transfer of data between cache memory 32 and a host processor is not buffered by an intermediate host director processor 24, 26, but rather is fed directly to/from cache memory 32. Accordingly, the respective host director processor is otherwise idle under these conditions.

Figures 2, 3, 4:
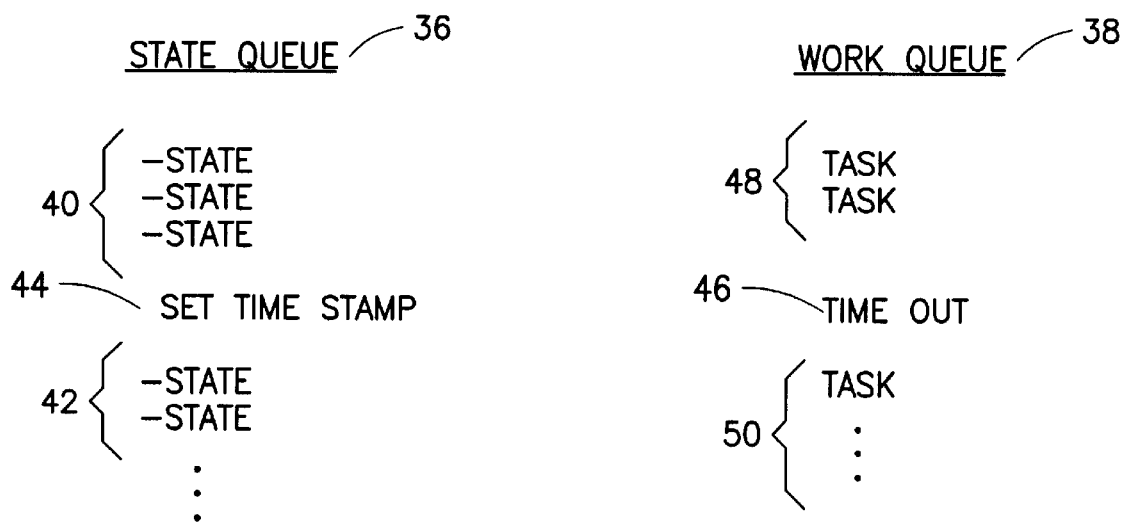
FIG. 2 schematically illustrates a state entry in a state queue.
FIG. 3 schematically illustrates a state queue.
FIG. 4 schematically illustrates a work queue that is maintained by the front-end processor of FIG. 1.

As shown in FIG. 3, each state queue 36 comprises a list of state procedures 40, 42, with one or more interspersed "set time stamp" procedures 44. When a "set time stamp" procedure 44 reaches the top of a state queue 36 and is executed, it causes entry into a register (not shown) of a current machine time "Ts". As will be hereafter understood, time stamp value "Ts" is utilized by a "time out" task 46 in a work queue 38 (see FIG. 4) to determine when all states in state queue 36 must be executed, irrespective of a pending input/output request from a host processor. A set time stamp task is never removed from state queue 36, but rather recirculates thereon to assure that a set time stamp action is periodically executed.

Each work queue 38 further includes a series of tasks 48, 50, etc. which have been found ready to execute as a result of execution of an associated state in state queue 36. Time out task 46 is never removed from work queue 38, but rather recirculates thereon to assure that a time out function is periodically executed.

FIG. 2 illustrates the data values present in a state entry on a state queue 36. Each state entry includes a pointer to a next state, a pointer to a previous state, and an estimated worst case execution time for the particular state procedure. In general, the worst case execution time denotes the maximum possible time which the execution of the specific state procedure can consume. Clearly, the execution of the state can consume less time than the worst case value. Finally, each state entry includes a substate value which defines further parameters that are to be utilized by the state procedure during its execution, e.g., a logical path to be followed, a logical device to be accessed, etc.

Figure 5:
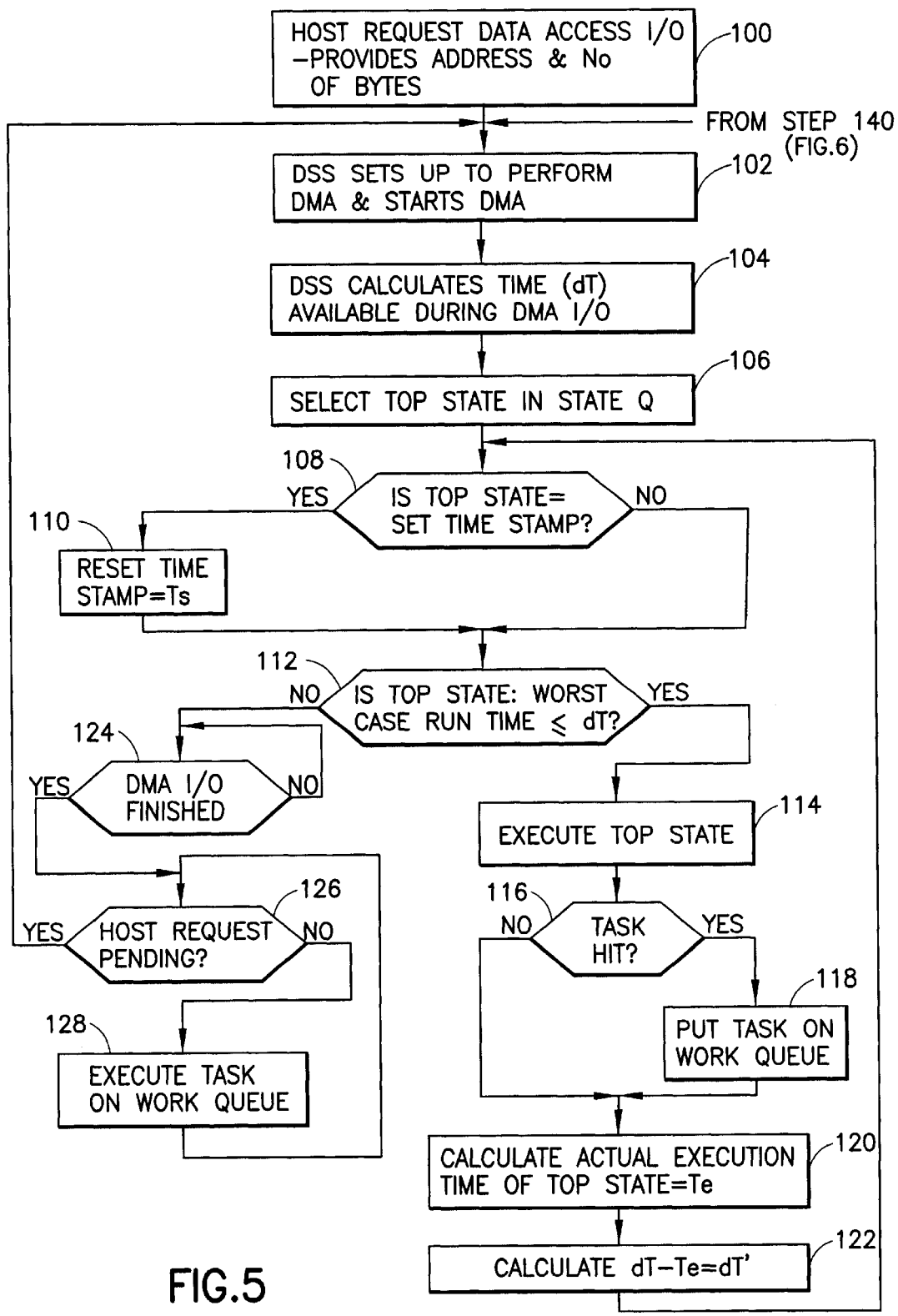
FIGS. 5 and 6 comprise a logical flow diagram illustrating the method of the invention.
Figure 6:
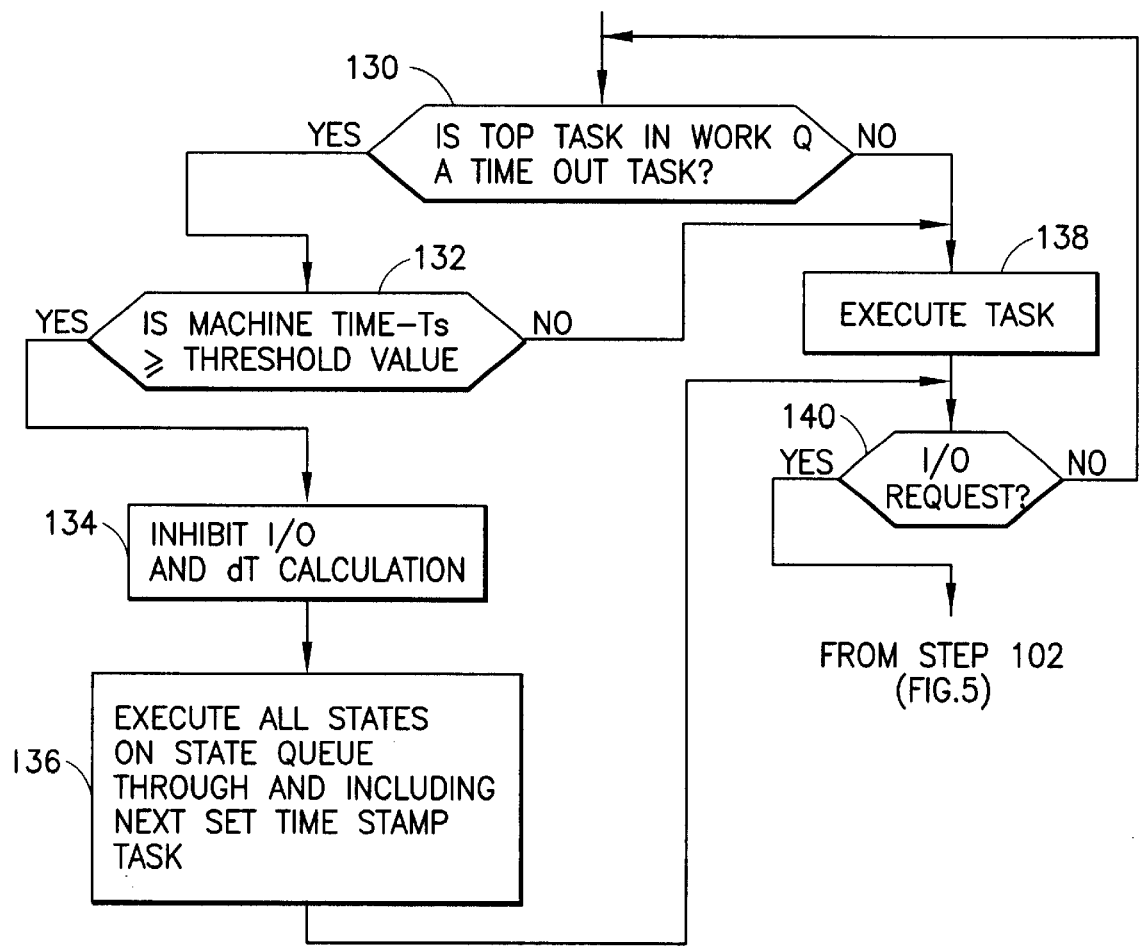

Turning now to FIGS. 5 and 6, the method of the invention will be described, as executed under control of a state execution procedure 31. Initially, assume that a host processor requests a data access input/output action from DSS 10. In the known manner, the host processor provides the address of the data to be accessed and the number of bytes to be transferred (step 100). Thereafter, DSS 10 is set up to perform a direct memory access (DMA) and commences the DMA (step 102). Such set up involves the accessing of the specified data from a disk storage unit and the buffering thereof in-cache memory 32, under control of controller 30. Thereafter a DMA transfer occurs, between cache memory 32 and a host processor.

At this point, a host director processor (e.g. 24) calculates a time dT available during the DMA input/output access action. Time dT is calculated based upon the "number of bytes" parameter received from the host processor (step 104). Instead of remaining idle during the DMA action, host director processor 24 is actuated to select a top state from a state queue 36 in its table memory 34 (step 106). Host director processor 24 then determines if the top state is a "set time stamp" state (decision step 108). If yes, the time stamp parameter Ts is reset to the current time indicated by a time keeping function within host director processor 24.

Next, a "worst case execution time" parameter is derived from the state entry in state queue 36. That parameter is compared with the available time parameter dT calculated in step 104 to determine if it is less than or equal to dT (decision step 112). If yes, it is concluded that sufficient time is available to execute the top state in state queue 36. Note, that the time available parameter dT is not set equal to the total calculated time to be taken by the DMA access action but rather is set to a somewhat shorter time so as to enable host director processor 24 to be reset and ready to accept a next I/O access upon the completion of the current DMA access.

As shown in step 114, host director processor then proceeds to execute the top state in state queue 36. As above indicated, execution of a state involves the examination of a potential task to see if it is ready to execute. If the task is found ready to execute (i.e., a task "hit") (decision step 116), the task is placed on work queue 38 (step 118). Thereafter, the procedure moves to step 120, wherein host director processor 24 calculates the actual execution time "Te" taken by the just executed state. Then, a new available time parameter dT' is calculated in accord with the expression: dT'=dT—Te (step 122).

The procedure then recycles back to decision step 108 and if the top state is not a "set time stamp" task, moves to step 112 to determine if the top state in state queue 36 exhibits a worst case run time parameter that is less than or equal to dT'. If yes, the procedure moves down the right-hand series of steps from decision step 112. If no, the procedure waits until the DMA action is finished (decision step 124) and then determines if a host processor request for an input/output action is pending (decision step 126). If yes, the procedure moves back to step 102 and recycles; and if no, the procedure moves to execute a task on work queue 38 (step 128). Here it is to be understood that the DMA action has finished and that the execution of a task on work queue 38 results in overhead "expense" for DSS 10.

Further details of the actions which occur during step 128 are shown in FIG. 6. Initially, it is determined if the top task in work queue 38 is a "time out" task (decision step 130). If yes, the procedure moves to decision step 132 where it is determined if the current machine time less Ts is greater than or equal to a threshold value. That threshold value sets a time duration, at the expiration of which, all states in state queue 36 must be executed to assure that the necessary housekeeping actions are carried out for DSS 10.

If a no response issues from decisions step 132, the procedure moves to step 138 where the task is executed. Thereafter, the procedure moves through decision step 140 where, if no input/output request is pending, the procedure recycles back to decision step 130. Otherwise, the procedure moves back to step 102 (FIG. 5).

Returning to decision step 132, if it is determined that the calculation shown therein indicates that the threshold value has been equaled or exceeded, any input/output access request is placed on a queue (i.e., temporarily inhibited) (step 134), as is any resulting calculation of the parameter dT. Then, host director processor 24 executes all states on state queue 36 (including the next listed set time stamp task) (step 136) and places on work queue 38 any associated tasks found to be ready to execute. Thereafter, the procedure moves to decision step 140 and proceeds as shown. In such manner, it is assured that, periodically, all states are executed and any associated ready-to-execute tasks are queued for execution during overhead time of host director processor 24.

Accordingly, it can be seen that DSS 10 is enabled to perform processing functions during an input/output access from a host processor, while assuring that the housekeeping tasks will not interfere with host processor access actions. Further, tasks which are found to be ready to execute are placed on a work queue to be immediately ready for execution during "overhead" time within DSS 10. Further, DSS 10 is forced, periodically, to execute all states on state queue 36 so as to assure that all housekeeping actions are accomplished, at least periodically.

It should be understood that the foregoing description is only illustrative of the invention. Various alternatives and modifications can be devised by those skilled in the art without departing from the invention. For instance, while state execution procedure 31 is shown as already loaded in a host director processor, it may be configured on a storage media which is selectively loaded as needed. Accordingly, the present invention is intended to embrace all such alternatives, modifications and variances which fall within the scope of the appended claims.

What is claimed is:

1. A method for enabling overlapped performance of data processing actions during data transfers between a memory system and a host processor, said memory system including a memory processor which enables said data transfers and a state queue which holds a plurality of states, each state comprising a self contained procedure for determining a readiness to execute of an associated task, said method comprising:

determining an amount of available time during a data transfer;

causing said memory processor to execute a first state from said state queue during said data transfer if said available time exceeds or is equal to an estimated execution time of said first state;

if a task associated with said first state is found to be ready to execute, listing said task on a task work queue for execution subsequent to said data transfer.

after execution of said first state, determining remaining time from said available time; and causing said memory processor to execute a second state from said state queue during said data transfer if said remaining time exceeds or is equal to an estimated execution time of said second state, wherein said remaining time is determined by subtracting actual execution time for said first task from said available time.

2. The method as recited in claim 1, wherein said memory processor is inhibited from executing said first state during said data transfer if said available time is less than said estimated execution time of said first state.

3. The method as recited in claim 1, further comprising:

subsequent to said data transfer, accessing a first task on said task work queue; and if said first task is a task requiring execution of states listed on said state queue, comparing a current machine time value and a time stamp and if a difference therebetween exceeds or equals a threshold value, inhibiting further data transfers and causing said memory processor to execute all states listed on said state queue.

4. The method as recited in claim 3, wherein said memory processor causes a set time stamp state to be listed on said state queue and said step for causing said memory processor to execute a first state, upon encountering said set time stamp state, resets a time value associated with said time stamp in response thereto.

5. A memory media including a procedure for enabling a memory processor to overlap performance of data processing actions during data transfers between a memory system and a host processor, said memory system including said memory processor and a state queue which holds a plurality of states, each state comprising a self contained procedure for determining a readiness to execute of an associated task, said memory media comprising:

means for controlling said memory processor to determine an amount of available time during a data transfer;

means for controlling said memory processor to cause said memory processor to execute a first state from said state queue during said data transfer if said available time exceeds or is equal to an estimated execution time of said first state;

means for controlling said memory processor to list a task associated with said first state on a task work queue for execution subsequent to said data transfer, if a said task associated with said first state is found to be ready to execute.

means for controlling said memory processor, after execution of said first state, to determine remaining time from said available time; and means for controlling said memory processor to cause said memory processor to execute a second state from said state queue during said data transfer if said remaining time exceeds or is equal to an estimated execution time of said second state wherein said remaining time is determined by subtracting actual execution time for said first task from said available time.

6. The memory media as recited in claim 5, wherein said means for controlling said memory processor to cause said memory processor to execute a first state inhibits said memory processor from executing said first state during said data transfer if said available time is less than said estimated execution time of said first state.

7. The memory media as recited in claim 5, further comprising:

means for controlling said memory processor to access a first task on said task work queue subsequent to said data transfer; and means responsive to said first task being a task which requires execution of states listed on said state queue, for controlling said memory processor to compare a current machine time value and a time stamp and if a difference therebetween exceeds or equals a threshold value, for controlling said memory processor to inhibit further data transfers and to cause execution of all states listed on said state queue.

8. The memory media as recited in claim 7, wherein said memory processor causes a set time stamp state to be listed on said state queue and said means for controlling said memory processor to cause said memory processor to execute a first state, upon encountering said set time stamp state, resets a time value associated with said time stamp in response thereto.

\* \* \* \* \*